US008634813B2

(12) United States Patent
Paschetto et al.

(10) Patent No.: US 8,634,813 B2

(45) Date of Patent: Jan. 21, 2014

(54) METHOD AND SYSTEM FOR MONITORING A MOBILE DEVICE OVER A VIDEO NETWORK

(75) Inventors: James E. Paschetto, Waltham, MA (US); Vincent Phuah, Waltham, MA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 789 days.

(21) Appl. No.: 11/694,177

(22) Filed: Mar. 30, 2007

(65) Prior Publication Data

US 2008/0242319 A1 Oct. 2, 2008

Related U.S. Application Data

(60) Provisional application No. 60/867,494, filed on Nov. 28, 2006.

(51) Int. Cl.

| | |
|---|---|
| ***H04M 3/493*** | (2006.01) |
| ***H04W 24/00*** | (2009.01) |
| ***H04N 7/167*** | (2011.01) |

(52) U.S. Cl.

USPC .................. 455/414.2; 455/404.2; 455/456.1; 725/31

(58) Field of Classification Search

USPC ........................ 455/404.2, 457, 414.1–414.4, 455/418–422.1, 432.1–432.3, 456.1–456.6, 455/550.1, 552.1, 553.1, 556.1, 565, 566, 455/4.2; 370/335, 336, 342, 343, 345, 370/310.2, 328, 338, 331, 352–356, 10.2; 725/25, 31

See application file for complete search history.

(56) References Cited

U.S. PATENT DOCUMENTS

| | | | | |
|---|---|---|---|---|
| 5,794,174 | A * | 8/1998 | Janky et al. | 701/207 |
| 6,975,941 | B1 * | 12/2005 | Lau et al. | 701/213 |
| 7,783,299 | B2 * | 8/2010 | Anderson et al. | 455/456.1 |
| 2001/0000194 | A1 * | 4/2001 | Sequeira | 725/39 |
| 2004/0031058 | A1 * | 2/2004 | Reisman | 725/112 |
| 2004/0203852 | A1 * | 10/2004 | Janakiraman | 455/456.1 |
| 2005/0159863 | A1 * | 7/2005 | Howard et al. | 701/37 |
| 2005/0251827 | A1 * | 11/2005 | Ellis et al. | 725/47 |
| 2006/0085812 | A1 * | 4/2006 | Shishegar et al. | 725/19 |

* cited by examiner

*Primary Examiner* — San Htun

(57) ABSTRACT

An approach is provided for monitoring location of a user of a mobile device. A notification triggering event based on location of a mobile device is detected. Notification information is generated in response to the detection of the notification triggering event. The notification information to a video processor (e.g., set-top box) that is configured to transmit the notification information to a display.

20 Claims, 11 Drawing Sheets

FIG. 5B
511
Child Zone Alert
Tyler leaving home at
6:15 PM PST, Feb 28
513

FIG. 6A

601

| TIME | DAY | ASSOCIATED ACTIVITY | DISPLAY CRITERIA |
|---|---|---|---|
| 8:00 AM | MON – FRI | 5 MINS AFTER SCHOOL STARTS | TEXT ADDRESS |
| 2:30 PM | MON – FRI | 15 MINS AFTER SCHOOL ENDS | TEXT ADDRESS |
| 7:00 PM | WED | BASEBALL PRACTICE | TEXT ADDRESS |
| 9:30 PM | MON – THUR & SUN | CURFEW | GRAPHICAL MAP |
| 12:00 PM | FRI & SAT | CURFEW | GRAPHICAL MAP |

FIG. 6B

603

| LOCATION | ADDRESS | ZONE | ALERT | DISPLAY CRITERIA |
|---|---|---|---|---|
| HOME | 45678 LONG AVE<br>CITY, STATE 12346 | 0.25 MILE RADIUS | ENTERING OR LEAVING | ENTERING – TEXT ADDRESS<br>LEAVING – GRAPHICAL MAP |
| SCHOOL | 25698 FIRST STREET<br>CITY, STATE 12346 | 0.5 MILE RADIUS | ENTERING OR LEAVING | ENTERING – TEXT ADDRESS<br>LEAVING – GRAPHICAL MAP |
| LIBRARY | 56894 SHORT ROAD<br>CITY, STATE 12346 | 0.25 MILE RADIUS | ENTERING OR LEAVING | ENTERING – TEXT ADDRESS<br>LEAVING – GRAPHICAL MAP |
| STATE LINE | N/A | N/A | LEAVING | GRAPHICAL MAP |
| KNOWN CRIMINAL | 123 RANDOM STREET<br>CITY, STATE 12364 | 1.0 MILE RADIUS | ENTERING | GRAPHICAL MAP |

METHOD AND SYSTEM FOR MONITORING A MOBILE DEVICE OVER A VIDEO NETWORK

RELATED APPLICATIONS

This application claims the benefit of the earlier filing date under 35 U.S.C. §119(e) of U.S. Provisional Application Ser. No. 60/867,494 filed Nov 28, 2006, entitled "Method And System For Monitoring A Mobile Device Over A Video Network," the entirety of which is incorporated by reference.

BACKGROUND OF THE INVENTION

Modern lifestyles have become evermore reliant on mobile communications. As such, an increasing number of individuals are utilizing wireless communication devices, such as cellular phones, laptop computers, pagers, personal communication systems (PCS), personal digital assistants (PDA), and the like, to achieve the advantages of ubiquitous communication at any given time or place. Further, advances in technology, services, and affordability have facilitated the level of device penetration to the point of children, teenagers, and the elderly, becoming equipped with the ability to readily communicate without geographic or time constraints.

Telecommunication service providers have enabled wireless device location and tracking from other wireless communication or computing devices to address safety concerns of the mobile user. However, these services have been traditionally confined to the telecommunications arena.

Therefore, there is a need for an approach for location tracking and notification that can seamlessly operate over other communication media.

BRIEF DESCRIPTION OF THE DRAWINGS

Various exemplary embodiments are illustrated by way of example, and not by way of limitation, in the figures of the accompanying drawings in which like reference numerals refer to similar elements and in which:

FIGS. 6A and 6B are exemplary notification schedules based on, respectively, time and location, according to various exemplary embodiments;

DESCRIPTION OF THE PREFERRED EMBODIMENT

A system, method, and software for monitoring a mobile device and generating a notification for transmission over a video network are described. In the following description, for the purposes of explanation, numerous specific details are set forth in order to provide a thorough understanding of the present invention. It is apparent, however, to one skilled in the art that the various exemplary embodiments may be practiced without these specific details or with an equivalent arrangement. In other instances, well-known structures and devices are shown in block diagram form in order to avoid unnecessarily obscuring the exemplary embodiments.

Although the various exemplary embodiments are described with respect to a set-top box, it is contemplated that these embodiments have applicability to any device capable of processing video signals for presentation to a user.

Figure 1:
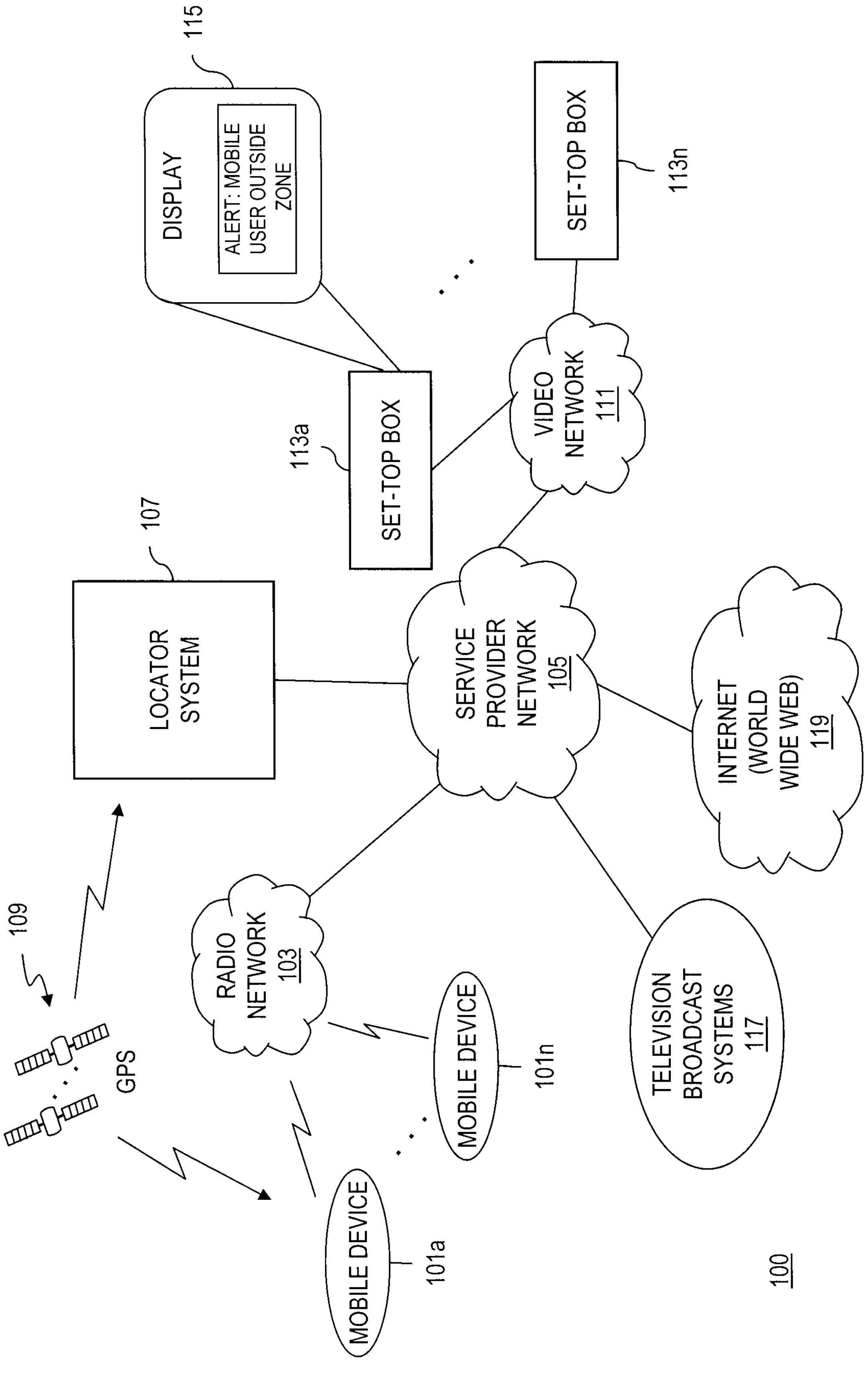
FIG. 1 is a diagram of a system capable of monitoring a mobile device and transmitting a notification over a video network, according to an exemplary embodiment.

FIG. 1 is a diagram of a system capable of monitoring a mobile device and transmitting a notification over a video network, according to an exemplary embodiment. For the purposes of illustration, a system 100 for monitoring multiple mobile units 101*a*-101*n* (e.g., cellular phones) is described with respect to a radio network 103, such as a cellular network. As used herein, the terms mobile units, mobile stations, and mobile devices are interchangeable. A service provider network 105 includes a locator system 107 that implements a monitoring service, whereby a user can receive notification information about the location of a mobile device (e.g., 101*a*). This monitoring and notification service provides notifications about the location of users associated with corresponding mobile devices 101 may be generated based on, for example, time-of-day and/or location of the mobile devices. In this manner, a subscriber, such as a parent, of the monitoring and notification service, can track the whereabouts of other users (e.g., children) of the mobile devices 101.

It is observed that mobile device users who enjoy an increased level of mobility have to be mindful of their location and status of incoming calls to ensure their surrounding environment is safe and prevent an apprehensive guardian from becoming agitated. The approach, according to certain embodiments, stems from the recognition that dependent mobile device users, such as juveniles, may benefit from an increased level of mobility, while alleviating the associated burden of having to constantly "check in" with their guardian.

Traditionally, avoiding the occurrence of an irritated or otherwise unhappy guardian required mobile device users to constantly remember when and where to manually check in with, and answer incoming calls from, their guardian. However, such a burden is often too daunting to manage alone. Frequently, these users forget (or do not want) to constantly tell their guardian where they are or where they are going. Moreover, having to answer incoming calls may create an annoyance or disruption to others, e.g., when at a library, movie theater, restaurant, or other like establishment. As such, guardians frequently resort to disciplining and/or more closely monitoring/regulating their dependents (often times with additional calls) thus, exacerbating the situation.

Furthermore, guardians had to trust their dependents and hope they remained safe. Telecommunication service providers have developed wireless device location and tracking services to help alleviate concerns of the guardian with respect to safety and mobility. One drawback, however, is that these services are limited to the telecommunications and computing markets. Currently, little attention has been afforded to extending and enhancing mobile station tracking and notification within the entertainment arena. Moreover, these services do not effectively account for the life styles of the users, making the process of monitoring a rather burdensome one.

It is noted that television remains the prevalent global medium for entertainment and information as individuals spend a great deal of time tuning into televised media. Accordingly, the service provider network 105 integrates this medium, via a video network 111, with that of the telecommunications, computing, and media environments, thereby broadening the scope of devices available to guardians for mobile device tracking and notification. In this manner, the locator system 107 relieves mobile device users from having to constantly check in or answer an incoming call from their guardian, enabling users via user equipment, such as set-top boxes 113*a*-113*n*, to automatically locate, track, and receive notifications on the video network concerning mobile devices 101. Although the user equipment is described with respect to a set-top box, it is contemplated that the various embodiments have applicability to any device capable of processing video (i.e., video processor) streams.

In a typical scenario, an individual (e.g., a subscriber of the monitoring and notification service) may tune into a televised media program using set-top box 113*a*, while retaining the ability to stay in touch with and supervise users of a mobile device 101. Moreover, the service provider network 105 can enable individuals utilizing set-top boxes 113*a*-113*n* to interact, in one embodiment, through personalized communications channels.

The video network 111 can employ various broadband access technologies including, for example, digital subscriber line (DSL), fiber optic services (FiOS), cable, worldwide interoperability for microwave access (WiMAX), etc., to connect the set-top boxes 113*a*-113*n* to the services of the service provider network 105. According to one embodiment, the set-top box 113*a* includes outputs to a display 115. The display 115 and the set-top box 113*a*, for example, may support high resolution video streams, such as high definition television (HDTV). The set top box 113*a* can encapsulate data into proper format with required credentials before transmitting onto the network 111 and de-encapsulate incoming traffic to dispatch data to the display 115. In an exemplary embodiment, the display 115 may be configured with Internet Protocol (IP) capability (i.e., includes an Internet Protocol (IP) stack, or is otherwise network addressable), such that the function of set-top box 113*a* may be assumed by the display 115. In this manner, an IP ready, HDTV display 115 can directly connect to the video network 111. Although the set-top box 113*a*, and the display 115 are shown as separate components, it is contemplated that these components may be integrated as a single component.

In one embodiment, the service provider network 105 utilizes an authentication module (not shown) to perform user authentication services to determine that users are indeed subscribers to the monitoring and notification service. An authentication schema might require a user name and password, a key access number, a unique machine, or identifier of the user equipment (e.g., media access control (MAC) address), etc., as well as any combination thereof. Once the user equipment (e.g., set-top box 113*a*) is authenticated, connections from the set-top boxes 113 to the locator system 107 can be established directly. Further, the authentication module may grant users the right to monitor and receive notifications concerning one or more mobile stations serviced by radio network 103 by revoking existing sets of digital certificates associated with a first mobile station, and issuing new sets of digital certificates mapped to a second mobile station. In this regard, a set-top box 113*a* may start a new monitoring and notification session concerning the second mobile station, whereas the previous session will automatically be closed when the "old" or prior certificates associated with the first mobile station are revoked. This enables users to initiate secure sessions at any given set-top box 113*a*-113*n* linked to system 107, whether or not the specific user equipment belongs to that individual user. It is additionally contemplated that multiple rights sessions may exist concurrently.

The network 105 may also include a video streaming module (not shown) for acquiring and transmitting video feeds from television broadcast systems 117 or other content providers over the video network 111 to particular user equipment devices (e.g., set-top boxes 113*a*-113*n*). Further, the service provider network 105 can optionally support end-to-end data encryption in conjunction with video streaming services such that only authorized users are able to view content and interact with other legitimate users.

As shown, the locator system 107 can obtain location information of the mobile device 101 through use of a global positioning system (GPS) that employs an array of GPS satellites 109. As will be more fully described in FIG. 9, the mobile devices 101 can include a location module (not shown) for determining and transmitting the geographic location of the respective devices 101 to the locator system 107. The locator system 107 may obtain the current (or tracked) geographic position of a mobile device 101 in real-time (or historically) from the mobile device 101 itself. In the alternative, the system 107 may include a network-based mobile station locator to track and store the geographic position of mobile stations over a given period of time, such that locator system 107 may obtain geographic location information from the telecommunications network instead. Geographic location information may be obtained periodically (based on a predetermined time interval), continuously, or in an "on-demand" basis. Additionally, the location information can be determined by using assisted global positioning system (APGS), wherein the assistance data can include ephemeris data, approximate location, time, and other GPS aiding data needed to obtain location quickly or in obstructed view locations (in building, wooded areas, etc.).

Further, the locator system 107 is configured to generate and send notifications to the set-top box 113*a*-113*n*. In one embodiment, the notifications may be generated based on a policy or configuration of a user profile stored at a database (not shown) accessible by or resident at the service provider network 105 or within the mobile device. Similarly, notifications may be generated "on-demand" when requested by a user of the set-top box 113*a*. Notifications concerning a mobile device 101 may include information such as: designated mobile station (provided as a name, alias, or phone number), a schedule or calendar of events, current and/or tracked geographic location (provided as a textual address and/or as a graphical depiction on a map), time (current and/or at notification generation), date (current and/or at notification generation), direction and/or speed of travel, entrance and/or departure from a pre-defined zone, as well as other like data.

Additionally, the service provider network 105 may be accessible by the mobile devices 101 via a cellular gateway (not shown). In this manner, a mobile device (e.g., device 10la) may upload (or download) notification schedule profiles to (or from) the locator system 107. As such, guardians can input and modify notification schedules by manipulating the mobile device 10la itself or by configuring a network profile. Further, both the locator system 107 and the mobile device 10la can be configured to automatically synchronize profiles when one or more schedule parameters are adjusted. Moreover, the user of mobile device 101*a* can input and update notification information to be transmitted to the set-top box 113*a*. In the alternative, at the user of set-top box 113*a* may transmit messages to and/or communication with a mobile device 101*a*. In this scenario, both mobile device users and users at the set-top boxes 113 can proactively relay information and communicate with one another.

The service provider network 111 may also communicate with a public data network 119, such as the global Internet. As such, the monitoring and notification service can be extended to users with presence on the Internet.

Figure 2:
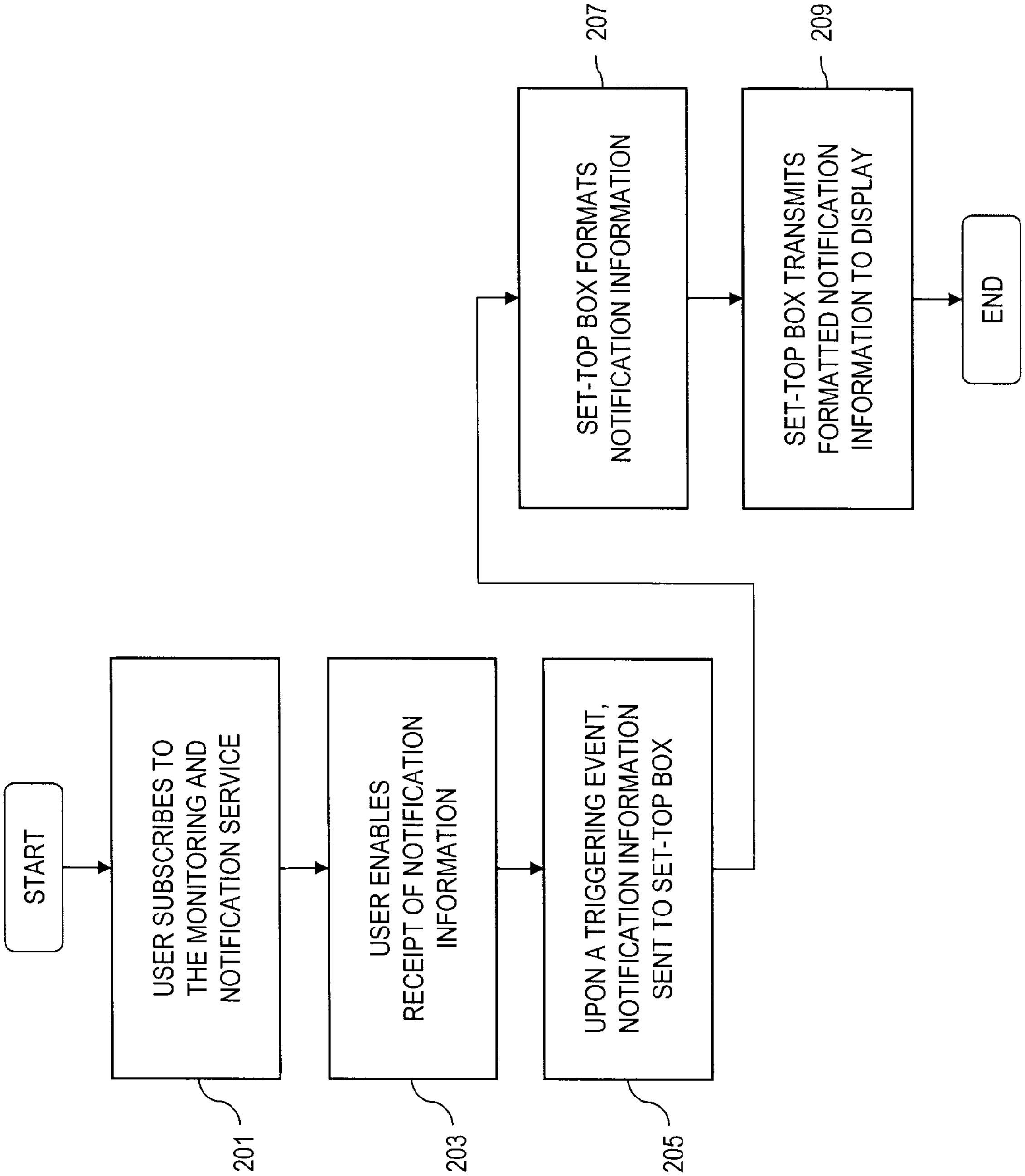
FIG. 2 is a flowchart of a process for monitoring a mobile device via a video system, according to an exemplary embodiment.

FIG. 2 is a flowchart of a process for monitoring a mobile device via a video system, according to an exemplary embodiment. In step 201, a new user subscribes to the monitoring and notification service utilizing a user equipment, such as the set-top box 113*a* (which is capable of processing multiple video channels or streams). That is, the user can interact with the set-top box 113*a* by means of an input device, such as a remote control, to activate software resident on the set-top box 113*a*. The software may then establish a connection to the service provider network 105 through an Internet Protocol (IP) based connection over the video network 111. Consequently, the user may register as a new subscriber of the monitoring and notification service, as well as obtain sufficient authentication information for establishing future sessions. Once registered and/or authenticated, the set-top box 113*a* may communicate with the locator system 107 for customizing a notification schedule to embody a user-defined policy for monitoring and generating notifications concerning one or more mobile devices 101*a*-101*n*.

After generating a notification schedule, the locator system 107 may store, a list of subscribers to the service, as well as, a list of subscriber set-top box identifiers, authentication information, and user-defined notification schedules. In step 203, the subscriber may interact, using the remote control, with the set-top box 113*a* to enable receipt of notification information the display 115. User indications may include various monitoring and notification generation parameters, such as: which one or more mobile station to track, which notification schedule should govern, time limits for transmitting alerts, other devices to receive alerts, etc.

Once activated, the locator system 107 may monitor the geographic position of mobile device 101 and relay that information to locator system 107. Upon a triggering event (i.e., satisfaction of one or more notification conditions), as established within the user-defined notification schedule, the locator system 107 generates, as in step 205, a signal embodying a monitoring and notification alert. The signal can be transmitted to all set-top boxes 113*a*-113*n* registered to receive such alerts. In this regard, the set-top box 113*a* may format the notification information for the display 115 (step 207). In step 209, the formatted alert is displayed on the user's display 115.

In one embodiment, the mobile device 101*a* may either reactively or proactively trigger and/or generate notification information to be transmitted to a user at the set-top box 113*a*. Under the reactive scenario, the mobile station 101*a* will generate notifications in a similar manner to the locator system 107; however, notifications are instead generated based on a notification schedule resident on the mobile device itself. The location of the mobile station 101*a* and/or time of day can trigger generation of notification information. This process will be more fully described below with respect to FIGS. 6A and 6B. In the alternative, and upon a notification triggering event, the mobile station 101*a* may merely transmit appropriate signals to the locator system 107 for requisite monitoring and notification information generation. As such, radio network resources may be conserved.

Under the proactive approach, the mobile device 101*a* may request a notification to be transmitted to the set-top box 113*a* about the mobile device's current or intended geographic location. In this embodiment, notifications are generated in similar fashion to user inquiries initiated via the set-top box 113*a*. In this example, either the mobile station 101*a* can generate the appropriate notification to be transmitted to the set-top box 113*a*, or the request can be handled by locator system 107.

Alternatively, the locator system 107 may transmit the appropriate notification information directly to the set-top box 113*a*. In either the case, the mobile device users may configure requests by providing a general or customized set of parameters for generating an intended notification.

Figure 3:
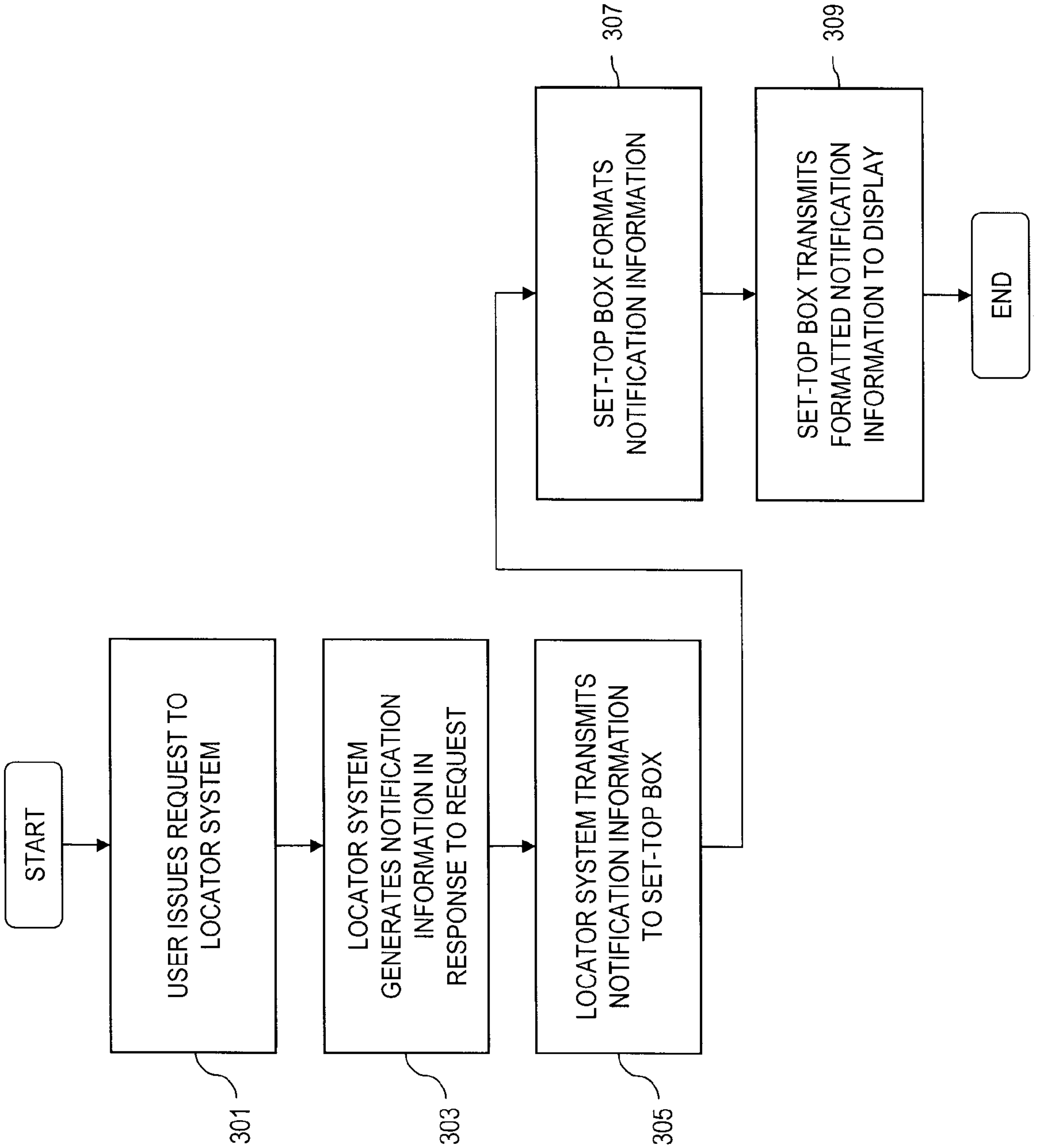
FIG. 3 is a flowchart of a process for requesting monitoring and notification information for display on a user equipment within a video network, according to an exemplary embodiment.

FIG. 3 is a flowchart of a process for requesting monitoring and notification information for display on a user equipment within a video network, according to an exemplary embodiment. In step 301, a subscriber issues a notification request to the locator system 107 through interactions with the set-top box 113*a* by a remote control. The user can generate a user-defined notification request concerning one or more mobile stations by selecting (via remote control) from a list of possible request parameters displayed by the software executing on set-top box 113*a*. These parameters may include which one or more of the mobile devices 101*a*-101*n* to track, which notification schedule should govern, time limits for transmitting alerts, other devices to receive alerts, etc. As soon as the request parameters are finalized, the set-top box 113*a* issues the request to locator system 107. It is contemplated that "batch" requests may be provided, as well as a list of previously issued requests.

In step 303, the locator system 107 may collect monitoring information related to the user's request parameters to formulate a response. In step 305, the formulated response can be transmitted to the requesting user's set-top box 113*a* upon satisfaction of the notification conditions specified by the request parameters. Once received, the set-top box 113*a*, in step 307, may format the response signal into an appropriate display and present the formatted information on the display 115 (step 309).

Figure 4:
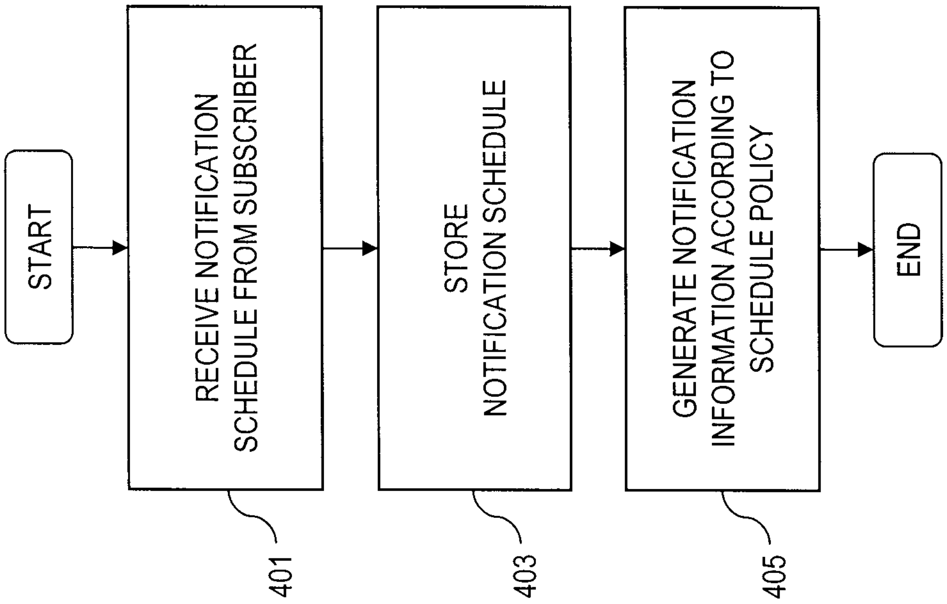
FIG. 4 is a flowchart of process for receiving notification scheduling information from a user, according to an exemplary embodiment.

FIG. 4 is a flowchart of process for receiving notification scheduling information from a user, according to an exemplary embodiment. In step 401, notification schedule information (or parameters) is received from the subscriber. According to an exemplary embodiment, the subscriber can input the information using an input device associated with either the set-top box 113*a* or a mobile device of the subscriber. In the alternative, this information can be remotely entered via a terminal using a web browser over the Internet 119 or through a voice application using an appropriate voice station (not shown). Next, the notification schedule information is stored, as in step 403, for example, in the locator system 107. In accordance with the notification schedule, various alerts are generated and transmitted to set-top box 113*a*, per step 405. To enforce or apply the notification schedule, the locator system 107 employs a monitoring process for the user specified information to trigger generation of notification information, as earlier described.

Figure 5A:
FIGS. 5A and 5B are diagrams of exemplary television displays of messages associated with the monitoring service of the system of FIG. 1.
Figure 5B:

FIGS. 5A and 5B are diagrams of exemplary television displays of messages associated with the monitoring service of the system of FIG. 1. In the scenario of FIG. 5A, the set-top box 113*a* is concurrently presenting to the user a video feed (illustrated as video screen 501) and a message 503, "Locate—Tyler," in a dual window format, for example. This message was generated based on the user's previously defined request inquiring about the location of Tyler's mobile device. In addition, the user's request parameters can include an inquiry into the time and date corresponding to the response. As such, the message 503 relays a "Locate—Tyler" response indicating that Tyler's mobile station was at 10 Brady St, San Francisco, Calif. 94103, at 3:37 pm (PST) traveling southwest at 3 miles per hour. The current date is circled on the displayed calendar along with a virtual "sticky note" (i.e., annotation) indicating Tyler's intended activity for the day. Moreover, a traffic designator reveals that surrounding traffic conditions are slow.

An exemplary monitoring and notification alert is shown in FIG. 3B. The notification information (or alert) is generated based on a notification schedule. In this scenario, set-top box 113*a* is concurrently presenting to the user a video feed (illustrated as video screen 511) overlaid by monitoring and notification alert 513, "Child Zone Alert." This alert was generated based on the user's previously established policy requiring alert when Tyler's mobile station leaves a designated "home" zone (defined as, for example, a circular area where the user's address relates to the center point and the "zone" is defined by all the geographic locations within a radius of 0.1 miles). Furthermore, the policy requires the monitoring and notification alert to include a time and date when the triggering event occurred. As such, the alert 513 relays a "Child Zone Alert" indicating that Tyler's mobile station left home at 6:15 pm, Pacific Standard Time (PST), on February 28.

FIGS. 6A and 6B are exemplary notification schedules based on, respectively, time and location, according to various exemplary embodiments. With exemplary notification schedule 601 of FIG. 7A, only the time-of-day is considered for notification generation. As shown, the time stamp, 8:00 AM on Mondays through Fridays, is reviewed for determining the location of mobile device 101*a* to ensure the user made it to school safely. This notification only requires a textual address to be displayed on set-top box 113. Another location determination and notification generation is required at time stamp, 2:30 PM on Mondays through Fridays, to inform the user's guardian as to the mobile station's whereabouts after school ends. As with the first example, only a textual address is specified. Further geographical position and notification generation will be triggered at 7:00 PM on Wednesdays to ensure the mobile device user arrived at baseball practice. Finally, graphical map notifications will be triggered and issued at 9:30 PM (Monday through Thursday, and Sunday) and at 12:00 PM (Friday and Saturday) to determine the location of the mobile station at the user's curfew.

As another example, geographic monitoring and notification generation may be triggered or invoked based on location of the mobile device 101, per notification schedule 603 within FIG. 6B. This schedule 603 maps textual address notifications upon mobile station entrance into various locations (or zones) of home, school, and library. In this manner, the locator system 107 may cause location determination and notification generation as the location of mobile device 101*a* changes between and among these environments. Further, graphical map notifications will be automatically generated when mobile device 101*a* leaves home, school, and library, as well as when the mobile station leaves the state or nears a known criminal's primary residence. A notification schedule may also specify monitoring and notification schemes when the mobile device is not within any of these locations.

Figure 7:
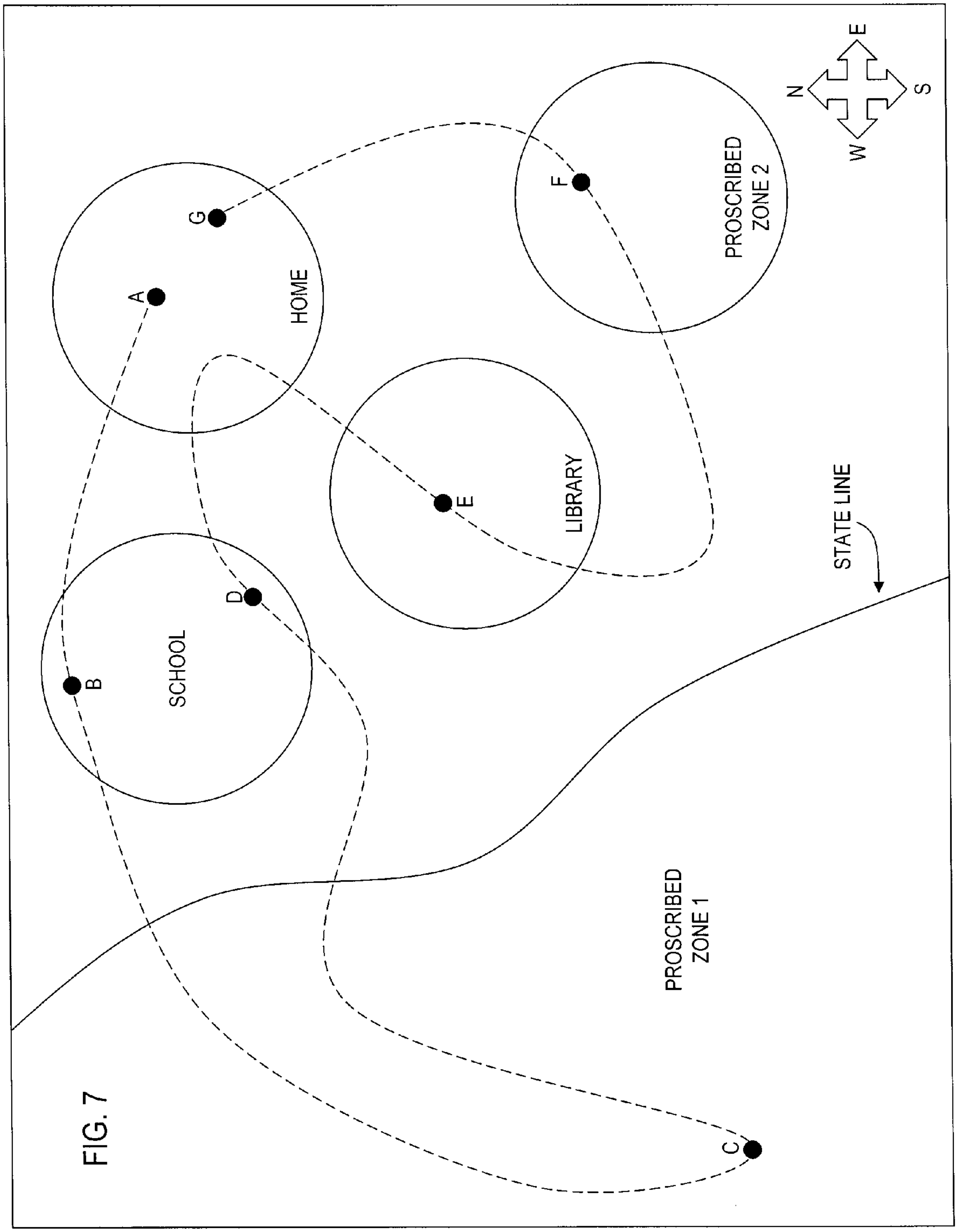
FIG. 7 is a diagram showing zone boundaries established for monitoring the mobile device of FIG. 1, according to an exemplary embodiment.

FIG. 7 is a diagram showing zone boundaries established for monitoring the mobile device of FIG. 1, according to an exemplary embodiment. In this example, the notification schedule specifies zones, involving routinely visited locations, e.g., school, home, and library, as well as proscribed zones 1 and 2. Thus, the triggering events (or notification conditions) include entrance or departure from the depicted zones, i.e., home, school, library, and prescribed zones 1 and 2. Under this scenario, mobile device 101*a* starts at Home at point A; however, because no substantial change in geographic position is detected, the device 101*a* will not invoke a notification.

On the way to school, i.e., point B, the user crosses two zone boundaries, i.e., leaving home and entering school, which represent enough of a geographical change in position to invoke notification. Accordingly, a notification will be sent to set-top box 113*a* relaying such monitoring, location and notification information as defined within the established notification schedule.

Perhaps for lunch, the user may decide to follow some friends across the state line to point C, within proscribed zone 1, to pickup a pizza at a famous Italian restaurant. In this regard, notifications will be generated when the mobile station leaves the school zone and when crossing the state line. Further, since the user's guardian previously established proscribed zone 1 as a limiting zone, a special emergency notification may be generated in addition to the other previous notifications. On the user's return trip to school, i.e., point D, notification scheduler will automatically trigger appropriate transmission of signals to set-top box 113*a* indicating departure from prescribe zone 1 and entrance back onto school grounds.

Now, perhaps the user leaves school to go home and pick up their study materials before heading off to the library, i.e., point E. As such, the locator system 107 generates and transmits notifications upon leaving school grounds, entering the user's home, as well as entering the library premises. As shown, mobile device 101 then moves to point F, which is in the proximity of proscribed zone 2 representing a zone surrounding a violent criminal's published address. Accordingly, a notification will be generated to alert set-top box 113 that the mobile station has left the library and a special emergency notification alerting the guardian of the mobile station's proximity to the criminal's home. The user finally travels home to point G, thereby invoking both a departure from proscribed zone 2 and a home entrance notification.

It is noted that the areas designated as home, school, and library, as well as proscribed zones 1 and 2, can be predetermined and configurable as a radial distance from an address specified by the user or defined as the area west, for example, of a known boundary line such as a state line. Also, it is contemplated that a time-of-day schedule can be used concurrently with a location schedule, in which a user may specify which schedule has priority if a conflict (or redundant operation) occurs.

Figure 8:
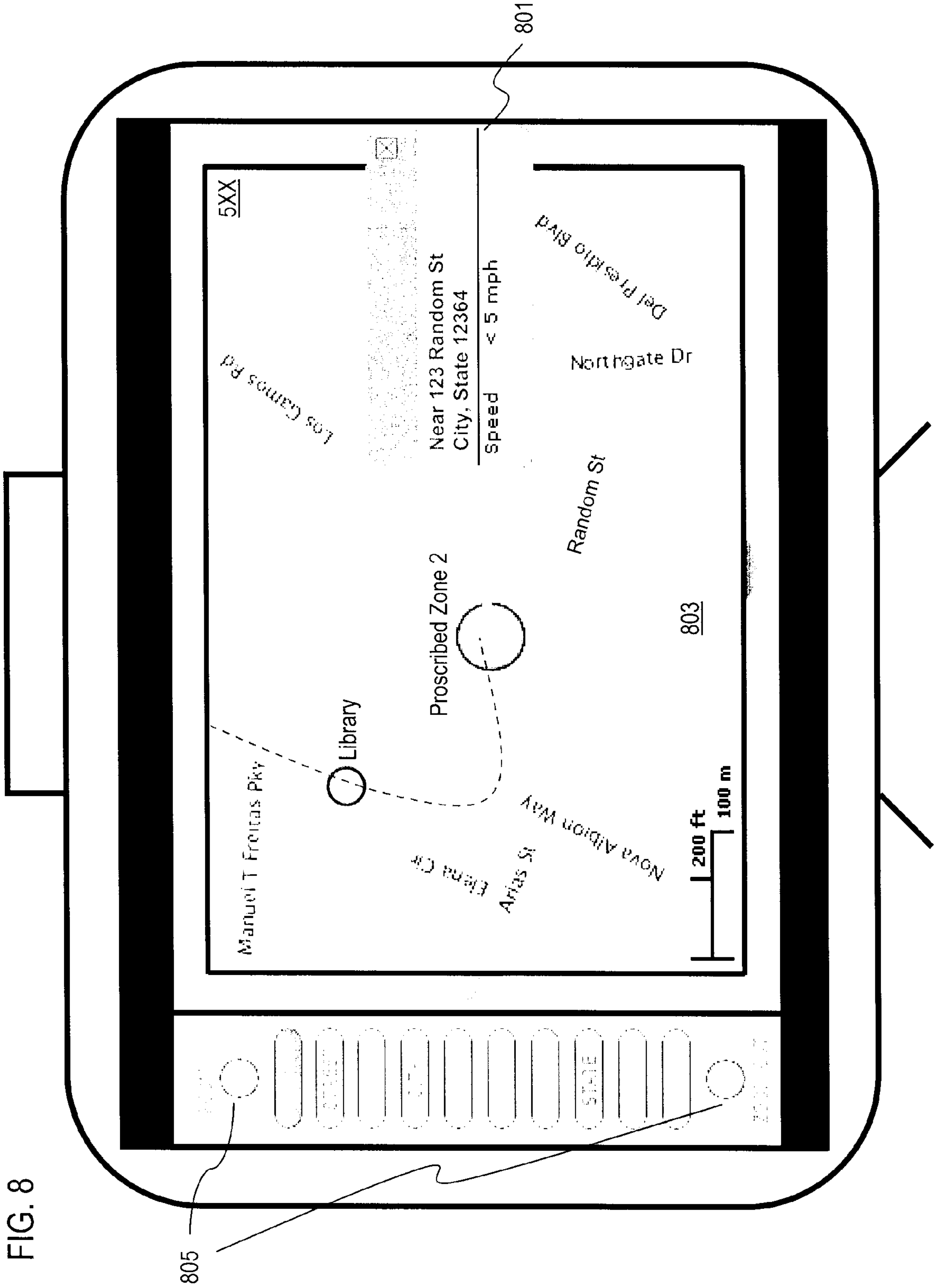
FIG. 8 is a diagram of a television display providing a map based on the zones established according to FIG. 7.

FIG. 8 is a diagram of a television display providing a map based on the zones established according to FIG. 7. In this scenario, it is assumed that a user ("Sarah") mobile device (e.g., device 101*n*) enters a proscribed zone 2 from the above example of FIG. 7, which triggers a tracking map alert to monitor the geographic location of Sarah's mobile device 101*n* until the alert box is closed. The set-top box 113*n* presents to the user an alert 801, which is a text box, along with a graphic 803 representing the map of the pertinent area. The alert informs Sarah's guardian of the current time, i.e., 11:07 am, corresponding to an approximate geographic location of Sarah's mobile station, i.e., near 123 Random St, City, State 12364.

Further, the mobile station's rate of travel, i.e., less than 5 miles per hour, is provided in the text box. The map 803 displays a history of tracked geographic locations within a relative time period. As illustrated, Sarah's mobile station traveled from the Library into Proscribed Zone 2 and is currently positioned therein. A zoom feature 805 is included to adjust the resolution and detail of map 803.

Figure 9:
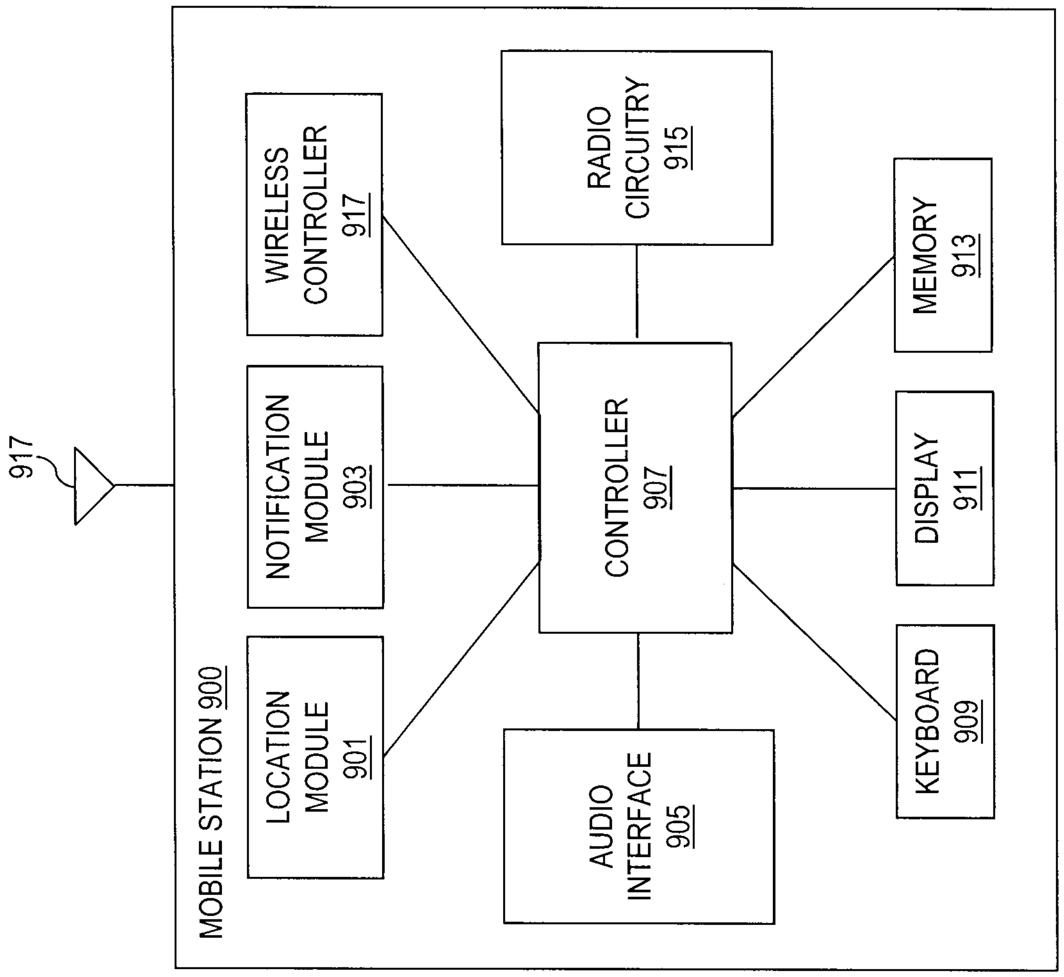
FIG. 9 is a diagram of a mobile device including a notification module for providing notifications, according to an exemplary embodiment.

FIG. 9 is a diagram of a mobile device including a notification module for providing notifications, according to an exemplary embodiment. In this embodiment, mobile device 900 includes a location module 901 for determining the geographic location of the device 900. By way of example, the location module 901 includes a global positioning system (GPS) receiver that receives position data from multiple GPS satellites 109. The position data is utilized by a notification module 903 to invoke and generate appropriate notification information to be transmitted to a user at set-top box 113 (as noted previously, this notification module is optional, as the functions can be assumed by the locator system 107).

When the mobile device 900 is brought into a predetermined zone (i.e., location), an audible alert may be generated at an audio interface 905 to notify the user of, for example, an unsafe or proscribed environment. Optionally, audio interface 905 may be included as part of an audio function circuitry (not shown) including a microphone and microphone amplifier that amplifies speech signal outputs from the microphone. The amplified speech signal output from the microphone may be fed to a coder/decoder (CODEC).

A controller 907 is provided to control functions of a keyboard 909 (or other input mechanism, e.g., touch screen), a display 911, and a memory 913. A user can input notification schedule parameters using keyboard 909. The display unit 911 provides a display to the user in support of various applications and mobile station functions, including display of geographical location and notification information. The memory 913 may be utilized to store various data including a user profile embodying the parameters of a notification schedule.

The notification module 903, in one embodiment, in conjunction with the controller 907, designates and controls notification features (e.g., geographic location and notification information for transmission to set-top box 113*a*) on the mobile device 900 for a given set of circumstances dictated within notification schedule. A notification schedule may specify user defined parameters including time of day, location or speed of a mobile station, type of caller, priority of call, origin of call, or any combination thereof. Hence, the notification module 903 utilizes the above parameters (stored in memory 913) to control how and when geographical location and notification information is transmitted to set-top box 113*a*. Moreover, the mobile device 900 utilizes controller 907, notification module 903 and location module 901 to generate "on demand" responses to set-top box 113*a* requesting monitoring and/or notification information.

Additionally, the mobile device 900 employs radio circuitry 915 to communicate over, for example, the radio network 103 of FIG. 1 using radio frequency (RF) signaling. Radio circuitry 915 can be defined in terms of front-end and back-end characteristics. The front-end of the receiver encompasses all the of RF circuitry whereas, the back-end encompasses all of the base-band processing technology. For the purposes of explanation, voice signals transmitted to the mobile device 900 are received via antenna 917 and immediately amplified by a low noise amplifier (LNA) (not shown). A down converter (not shown) lowers the carrier frequency while a demodulator (not shown) strips away RF signaling, thereby leaving only a digital bit stream. The signal then goes through an equalizer (not shown) and is processed by a digital signal processor (DSP) (not shown). The DSP may, depending upon the implementation, perform any of a variety of conventional digital signal processing functions on voice signals. Additionally, the DSP may determine background noise levels of a local environment (from signals detected by the microphone) to adjust the gain of the microphone to compensate for the natural tendencies of a mobile device user. A digital-to-analog converter (DAC) (not shown) may convert the signal for audible output to the user through a speaker (not shown) included within audio interface 905, as controlled by controller 907.

The above described processes relating to monitoring of a mobile station over a video network may be implemented via software, hardware (e.g., general processor, DSP chip, an application specific integrated circuit (ASIC), field programmable gate arrays (FPGAs), etc.), firmware, or a combination thereof. Such exemplary hardware for performing the described functions is detailed below.

Figure 10:
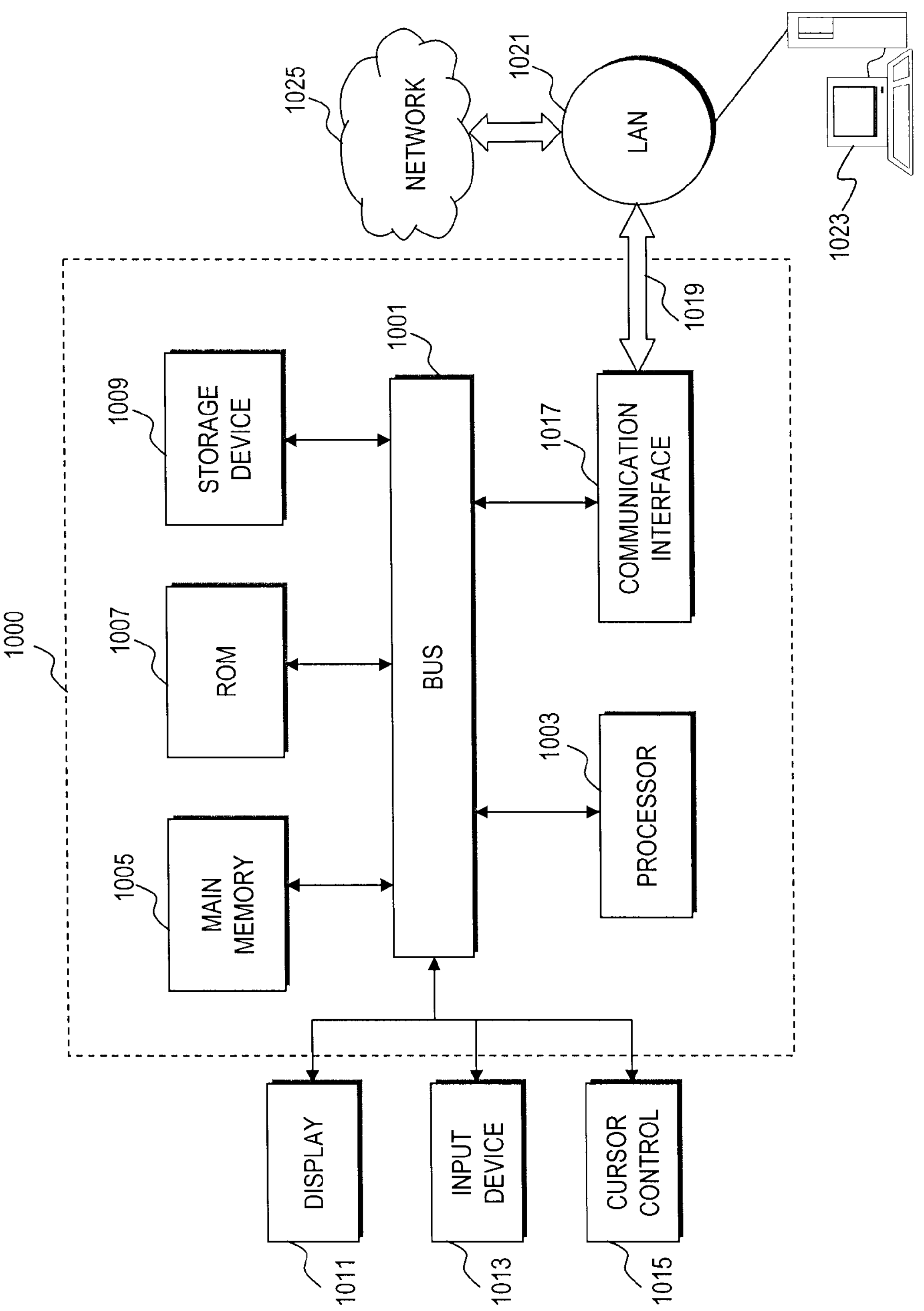
FIG. 10 depicts a computer system that can be used to implement various exemplary embodiments.

FIG. 10 illustrates a computer system 1000 upon which an embodiment according to an exemplary embodiment can be implemented. For example, the processes described herein can be implemented using the computer system 1000. The computer system 1000 includes a bus 1001 or other communication mechanism for communicating information and a processor 1003 coupled to the bus 1001 for processing information. The computer system 1000 also includes main memory 1005, such as a random access memory (RAM) or other dynamic storage device, coupled to the bus 1001 for storing information and instructions to be executed by the processor 1003. Main memory 1005 can also be used for storing temporary variables or other intermediate information during execution of instructions by the processor 1003. The computer system 1000 may further include a read only memory (ROM) 1007 or other static storage device coupled to the bus 1001 for storing static information and instructions for the processor 1003. A storage device 1009, such as a magnetic disk or optical disk, is coupled to the bus 1001 for persistently storing information and instructions.

The computer system 1000 may be coupled via the bus 1001 to a display 1011, such as a cathode ray tube (CRT), liquid crystal display, active matrix display, or plasma display, for displaying information to a computer user. An input device 1013, such as a keyboard including alphanumeric and other keys, is coupled to the bus 1001 for communicating information and command selections to the processor 1003. Another type of user input device is a cursor control 1015, such as a mouse, a trackball, or cursor direction keys, for communicating direction information and command selections to the processor 1003 and for controlling cursor movement on the display 1011.

According to one embodiment contemplated herein, the processes described are performed by the computer system 1000, in response to the processor 1003 executing an arrangement of instructions contained in main memory 1005. Such instructions can be read into main memory 1005 from another computer-readable medium, such as the storage device 1009. Execution of the arrangement of instructions contained in main memory 1005 causes the processor 1003 to perform the process steps described herein. One or more processors in a multi-processing arrangement may also be employed to execute the instructions contained in main memory 1005. In alternative embodiments, hard-wired circuitry may be used in place of or in combination with software instructions to implement certain embodiments. Thus, the exemplary embodiments are not limited to any specific combination of hardware circuitry and software.

The computer system 1000 also includes a communication interface 1017 coupled to bus 1001. The communication interface 1017 provides a two-way data communication coupling to a network link 1019 connected to a local network 1021. For example, the communication interface 1017 may be a digital subscriber line (DSL) card or modem, an integrated services digital network (ISDN) card, a cable modem, a telephone modem, or any other communication interface to provide a data communication connection to a corresponding type of communication line. As another example, communication interface 1017 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1017 sends and receives electrical, electromagnetic, or optical signals that carry digital data streams representing various types of information. Further, the communication interface 1017 can include peripheral interface devices, such as a Universal Serial Bus (USB) interface, a PCMCIA (Personal Computer Memory Card International Association) interface, etc. Although a single communication interface 1017 is depicted in FIG. 10, multiple communication interfaces can also be employed.

The network link 1019 typically provides data communication through one or more networks to other data devices. For example, the network link 1019 may provide a connection through local network 1021 to a host computer 1023, which has connectivity to a network 1025 (e.g. a wide area network (WAN) or the global packet data communication network now commonly referred to as the "Internet") or to data equipment operated by a service provider. The local network 1021 and the network 1025 both use electrical, electromagnetic, or optical signals to convey information and instructions. The signals through the various networks and the signals on the network link 1019 and through the communication interface 1017, which communicate digital data with the computer system 1000, are exemplary forms of carrier waves bearing the information and instructions.

The computer system 1000 can send messages and receive data, including program code, through the network(s), the network link 1019, and the communication interface 1017. In the Internet example, a server (not shown) might transmit requested code belonging to an application program for implementing an exemplary embodiment through the network 1025, the local network 1021 and the communication interface 1017. The processor 1003 may execute the transmitted code while being received and/or store the code in the storage device 1009, or other non-volatile storage for later execution. In this manner, the computer system 1000 may obtain application code in the form of a carrier wave.

The term "computer-readable medium" as used herein refers to any medium that participates in providing instructions to the processor 1003 for execution. Such a medium may take many forms, including but not limited to non-volatile media, volatile media, and transmission media. Non-volatile media include, for example, optical or magnetic disks, such as the storage device 1009. Volatile media include dynamic memory, such as main memory 1005. Transmission media include coaxial cables, copper wire and fiber optics, including the wires that comprise the bus 1001. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out various embodiments may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that flow. The specification and the drawings are accordingly to be regarded in an illustrative rather than restrictive sense.

What is claimed is:

1. A method comprising:

detecting a notification triggering event based on geographic location of a mobile device and either a time-of-day schedule or a location schedule, the geographic location is a textual address and/or a graphical depiction on a map;

generating notification information in response to the detection of the notification triggering event, the notification information is generated based on a user-defined policy or a configuration of a user profile; and transmitting the notification information to a video processor configured to provide one or more video channels, wherein the user-defined policy and the user profile are configurable at the video processor and are configurable to allow the time-of-day schedule and the location schedule to be used concurrently and to specify which schedule has a priority if a conflict occurs, and wherein an application resident on the video processor receives input from a user to enable or to disable receipt of the notification information, and the notification information is concurrently presented with a video feed.

2. A method as recited in claim 1, wherein the video processor is a set-top box.

3. A method as recited in claim 2, further comprising:

storing an identifier of the set-top box among a plurality of set-top box identifiers, wherein the mobile device is mapped to the stored identifier.

4. A method according to claim 1, wherein the notification information is based on a notification schedule resident on the mobile device.

5. A method according to claim 1, wherein the notification information includes a map.

6. A method as recited in claim 2, further comprising:

establishing a data communication session with an application resident on the set-top box, wherein the application formats the notification information for presentation of the notification information.

7. A method as recited in claim 1, wherein the video processor is programmable to customize a notification schedule in accordance with the user-defined policy or the user profile for monitoring and generating the notification information, and programmable to issue a request for the notification information.

8. An apparatus comprising:

a processor configured to detect a notification triggering event based on geographic location of a mobile device and either a time-of-day schedule or a location schedule, the geographic location is a textual address and/or a graphical depiction on a map, wherein the processor is further configured to generate notification information in response to the detection of the notification triggering event, the notification information is generated based on a user-defined policy or a configuration of a user profile; and a communication interface configured to transmit the notification information to a video processor configured to provide one or more video channels, wherein the user-defined policy and the user profile are configurable at the video processor and are configurable to allow the time-of-day schedule and the location schedule to be used concurrently and to specify which schedule has a priority if a conflict occurs, and wherein an application resident on the video processor receives input from a user to enable or to disable receipt of the notification information, and the notification information being concurrently presented with a video feed.

9. An apparatus as recited in claim 8, wherein the video processor is a set-top box.

10. An apparatus as recited in claim 9, further comprising:

a database coupled to the processor and configured to store an identifier of the set-top box among a plurality of set-top box identifiers, wherein the mobile device is mapped to the stored identifier.

11. An apparatus according to claim 8, wherein the notification information is based on a notification schedule resident on the mobile device.

12. An apparatus according to claim 8, wherein the notification information includes a map.

13. An apparatus as recited in claim 9, wherein the communication interface is further configured to establish a data communication session with an application resident on the set-top box, wherein the application formats the notification information for presentation of the notification information.

14. A method comprising:

receiving, at a set-top box, notification information indicating that a mobile device has satisfied a notification condition based on geographic location of the mobile device, the notification condition includes a time-of-day schedule or a location schedule;

transmitting the notification information to a display, the notification information being concurrently presented with a video feed, and executing an application within the set-top box, wherein the application receives input from a user to enable or to disable receipt of the notification information, wherein the geographic location is a textual address and/or a graphical depiction on a map, the notification information is generated based on a user-defined policy or a configuration of a user profile, and wherein the user-defined policy and the user profile are configurable at the set-top box and are configurable to allow the time-of-day schedule and the location schedule to be used concurrently and to specify which schedule has a priority if a conflict occurs.

15. A method according to claim 14, wherein the notification information is based on a notification schedule resident on the mobile device.

16. A method according to claim 14, wherein the notification information includes a map.

17. A method as recited in claim 14, further comprising:

executing an application within the set-top box, wherein the application formats the notification information for presentation of the notification information at the display.

18. An apparatus comprising:

a first communication interface configured to receive notification information indicating that a mobile device has satisfied a notification condition based on geographic location of the mobile device, the notification condition includes a time-of-day schedule or a location schedule;

a processor configured to execute, within a set-top box, an application for formatting the notification information; and a second communication interface configured to transmit the formatted notification information to a display, the notification information being concurrently presented with a video feed.

wherein the geographic location is a textual address and/or a graphical depiction on a map, the notification information is generated based on a user-defined policy or a configuration of a user profile, and wherein the application receives input from a user to enable or to disable receipt of the notification information, and wherein the user-defined policy and the user profile are configurable at the processor and are configurable to allow the time-of-day schedule and the location schedule to be used concurrently and to specify which schedule has a priority if a conflict occurs.

19. An apparatus according to claim 18, wherein the notification information is based on a notification schedule resident on the mobile device.

20. An apparatus according to claim 18, wherein the notification information includes a map.

* * * * *